United States Patent [19]
Thayer

[11] 3,858,611
[45] Jan. 7, 1975

[54] STEP OPENING THERMOSTATIC CONTROL DEVICE

[75] Inventor: George L. Thayer, St. Miraloma, Calif.

[73] Assignee: Robertshaw Controls Company, Richmond, Va.

[22] Filed: May 7, 1973

[21] Appl. No.: 357,736

[52] U.S. Cl. ....... 137/630.14, 137/630.15, 236/1 E, 236/48 R, 251/11
[51] Int. Cl. ......................... F03g 7/06, F16k 31/56
[58] Field of Search ................. 137/630.14, 630.15; 236/48 R, 1 E

[56] References Cited
UNITED STATES PATENTS
| | | | |
|---|---|---|---|
| 2,783,946 | 3/1957 | Lansky et al ..................... | 236/48 R |
| 3,275,035 | 9/1966 | Freeby et al ............... | 137/630.15 X |
| 3,439,711 | 4/1969 | Sherwood et al .............. | 137/630.15 |

Primary Examiner—Arnold Rosenthal
Attorney, Agent, or Firm—Anthony A. O'Brien

[57] ABSTRACT

A step opening thermostatic control device includes a main valve and a step valve for controlling flow through a flow passage between inlet and outlet ports of a casing, the main valve including a main valve stem carrying a valve seat for the step valve, and the step valve including a step valve stem extending through the main valve stem and carrying a step valve member biased toward the step valve seat such that movement of the step valve stem by temperature responsive means initially opens the step valve with opening of the main valve being delayed after the initial opening of the step valve.

2 Claims, 3 Drawing Figures

PATENTED JAN 7 1975    3,858,611

STEP OPENING THERMOSTATIC CONTROL DEVICE

1. Field of the Invention

The present invention pertains to thermostatic control devices and, more particularly, to thermostatic control devices having step opening characteristics.

2. Discussion of the Prior Art

The prior art, as exemplified by U.S. Pat. Nos. 3,159,346, 3,275,035, 3,642,029 and 3,682,382, is cognizant of the need for providing thermostatic control devices utilizing a pair of valves in combination with actuating means to effect initial step opening of the control device and subsequent modulation control of fuel flow therethrough in accordance with condition variations, such as temperature variations. Such prior art control devices have been found to provide satisfactory operation for their particular applications; however, such prior art devices have not been particularly effective for use with thermostat means not providing a great amount of linear movement in response to changes in temperature. For instance, relatively short "hot-rod" linear heatmotor type thermostats, such as disclosed in U.S. Pat. No. 2,989,841, which are conveniently used with 24-volt wall thermostats to cycle a thermostatic control device in response to sensed room temperature, do not provide a great amount of linear expansion and, therefore, in high capacity applications are limited in their ability to modulate the valve means in the control device after initial opening thereof. Conventional step opening, modulating type control devices require that the heatmotor, through amplification means in a snap-over clicker mechanism, lift a large main valve member an additional 0.020 inches to 0.030 inches in a typical application after a smaller valve has been opened by initial snap-over of the clicker mechanism; and, accordingly, prior art devices, as exemplified by the patents mentioned above, cannot be utilized with such limited linear expansion thermostats for high capacity applications.

SUMMARY OF THE INVENTION

The present invention is generally characterized in a step opening thermostatic control device including a casing having an inlet, an outlet and a flow passage therebetween, a main valve movable between open and closed positions to control flow through the flow passage and including a main valve seat disposed in the flow passage, a main valve member cooperating with the main valve seat and a hollow main valve stem carrying the main valve member, a step valve movable between open and closed positions to control flow through the flow passage and including a step valve seat carried on the main valve stem, a step valve member cooperating with the step valve seat and a step valve stem carrying the step valve member and extending through the main valve stem, temperature responsive means having actuated and released states, a first spring biasing the main valve and the step valve toward their closed positions, and a second spring biasing the step valve member toward the step valve seat, the temperature responsive means moving the step valve stem to move the step valve member away from the step valve seat against the force of the first and second springs to initially open the step valve when the temperature responsive means moves to the actuated state, and the main valve member being moved away from the main valve seat by the second spring and the temperature responsive means after the initial opening of the step valve to open the main valve whereby the thermostatic control device has a step opening characteristic with the opening of the main valve delayed after the initial opening of the step valve.

It is a primary object of the present invention to overcome the above deficiencies of the prior art by constructing a step opening thermostatic control device for use with thermostats having limited linear expansion.

An additional object of the present invention is to permit a thermostat having limited linear expansion to modulate a main valve in a step opening thermostatic control device for high capacity applications.

Another object of the present invention is to utilize a step valve and a main valve in a step opening thermostatic control device wherein the step valve initially opens to commence flow through the control device and closes when the main valve opens after a time delay.

The present invention has a further object in that a step opening thermostatic control device is provided with a step valve disposed in concentric, axial alignment inside a main valve with a spring held in compression between the main valve stem and the step valve stem to bias the step valve closed, regardless of the position of the main valve.

Yet another object of the present invention is to dispose a main valve member on an inlet chamber side of a main valve seat in a casing for a step opening thermostatic control device such that upon initial opening of a step valve having a valve seat carried by the main valve member, the main valve member will remain in engagement with the main valve seat due to the pressure differential thereacross.

Some of the advantages of the present invention over the prior art are that the thermostatic control device of the present invention can be utilized with thermostats having limited linear expansion for high capacity applications due to the wide opening of the main valve after initial opening of the step valve, and the step valve member is biased against the step valve seat, regardless of the position of the main valve to provide full opening operation.

Other objects and advantages of the present invention will become apparent from the following description of the preferred embodiment taken in conjunction with the accompanying drawing.

DESCRIPTION OF THE PREFERRED EMBODIMENT

Figure 1:
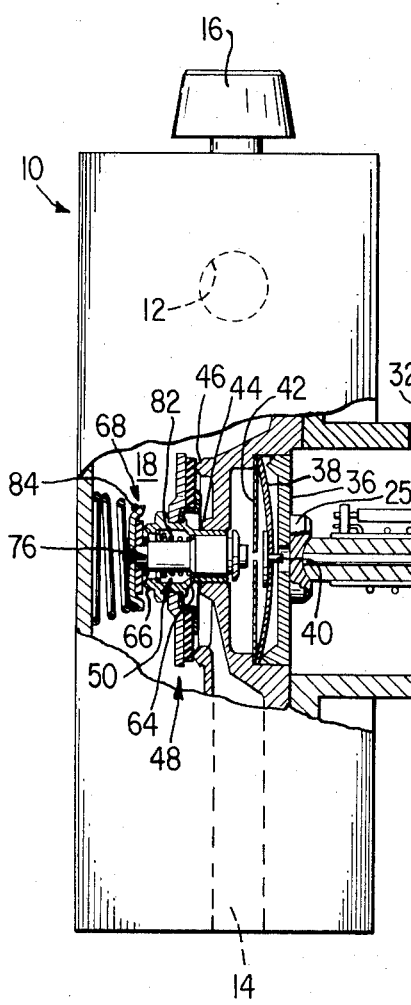
FIG. 1 is a side elevation of a step opening thermostatic control device with parts broken away and parts in section embodying the present invention.

As is illustrated in FIG. 1, the present invention is embodied in a step opening, thermostatic control device including a casing, indicated generally at 10, having an inlet port 12 for receiving fuel from a gas source (not shown), an outlet port 14 for delivering fuel to burner apparatus (not shown) and a flow passage therebetween. Such control devices conventionally include a second outlet port for delivering a smaller flow of fuel to a pilot burner of the burner apparatus whereby thermostatic cycling is permitted due to the pilot burner flame which effects reignition. A manually resettable thermoelectric safety device is retained in a flow permitting position in response to the pilot burner flame and shuts off all fuel flow upon extinquishment of the pilot burner flame. Since any type of pilot flow control device may be utilized, a detailed description is being omitted for the sake of brevity.

The flow of fuel into the casing 10 is controlled by a manually operated on-off valve 16 disposed adjacent the inlet port 12, as is well known in the art; the downstream side of the on-off valve 16 communicates with an inlet chamber 18, from which the fuel flow to the outlet port 14 is thermostatically controlled in response to a conventional heatmotor thermostat 20, such as the "hot-rod" linear heatmotor type thermostats disclosed in U.S. Pat. No. 2,989,841 which is incorporated herein by reference. Thermostat 20 includes a rod 22 having a high thermal coefficient of expansion with a small diameter bore 23 extending centrally, longitudinally therethrough, and a wire 24 of a highly heat conductive material, such as aluminum, is inserted in bore 23 such that its ends will maintain contact with an operating button 24 and an adjustment screw 25 mounted in a housing 27 for the thermostat extending from casing 10. A heating coil 28 is wrapped around rod 22 and is connected through leads 30 and 32 to a thermostatic switch (not shown) disposed in a space to be heated. The aluminum wire 24 forms a heat ballast means for the thermostat 20, and the adjustment screw 26 permits adjustment of the operating position of rod 22 which engages operating button 25 and adjustment screw 26 at its ends, as is more specifically described in the above-mentioned U.S. Pat. No. 2,989,841. While the thermostatic control device of the present invention can be used with any type of thermostatic means having a member movable in response to temperature to cause movement of operating button 25, the step opening thermostatic control device of the present invention is particularly advantageous for use with the relatively short, "hot-rod" linear heatmotor type thermostat 20 in that such heatmotors, which are conventionally used with wall thermostats, cannot provide sufficient linear expansion for operating conventional thermostatic control devices in high capacity applications whereas the step opening thermostatic control device of the present invention requires only a small amount of linear expansion after initial opening of the thermostat control device, as will be described hereinafter.

The operating button 25 engages a snap action mechanism sealingly mounted in a recess on the rear wall of casing 10. As conventionally utilized in thermostatic control devices, the snap action mechanism includes a fulcrum disc 36 having a flat surface engaged by the operating button 34 and an annular knife edge or fulcrum on its opposite surface adjacent its periphery. A clicker disc 38 has a bowed portion centrally carrying a headed stud 40 which is disposed adjacent the central portions of lever arms 42. For a more detailed description of the snap action mechanism, reference is made to the above-mentioned U.S. Pat. No. 3,159,346.

The rear wall recess for the snap action mechanism also forms a centrally bored, guide bushing 44 which is concentric with an internal wall of casing 10 that defines an annular main valve seat 46. The downstream side of the valve seat 46 defines a portion of the flow passage leading to the outlet port 14. A main valve member 48 is carried by a hollow main valve stem 50 having a neck 52 slidably received in guide bushing 44 and terminating at an end 54. Main valve member 48 is formed of a resilient disc 56 sandwiched between a retainer 58 and a back-up plate 60 mounted in an annular groove on a head portion 62 of the main valve stem 50, the disc 56 cooperating with the main valve seat 46 to control flow in the flow passage through the casing from inlet chamber 18 to outlet port 14. An opening 64 is formed in main valve stem 50 between neck 52 and head portion 62 to provide a flow path from an annular step valve seat 66 formed at the end of head portion 62 through the main valve stem 50.

A step valve member 68 is formed of a resilient disc 70 sandwiched between a retainer 72 and a back-up plate 74 mounted at an end of a step valve stem 76 extending concentrically through main valve stem 50, the disc 70 cooperating with step valve seat 66 to control flow in the flow passage through the casing from inlet chamber 18 through main valve stem 50 to outlet 14. Step valve stem 76 has an operating end 78 extending beyond the end 54 of the main valve stem 50 to be contacted by the snap action mechanism. A collar 80 extends around operating end 78 of the step valve stem in order to limit movement thereof relative to the main stem 50 by abutment with end 54 thereof, and the step valve member 68 is biased toward the step valve seat 66 by a coiled spring 82 mounted in compression between an annular groove in the head portion 62 of the main valve stem 50 and an annular shoulder formed around the step valve stem 76. The back-up plate 74 is formed with a peripheral lip for mounting a coiled spring 84 in compression abutting a wall of the casing 10.

In the following description of the operation of the step opening thermostatic control device of the present invention, it is assumed that manual on-off valve 16 is open to permit a pilot flow of fuel to a pilot burner which provides a pilot burner flame for ignition of the main flow of fuel during thermostatic cycling. At the same time, there is a main flow of fuel from the inlet port 12 through the on-off valve 16 to the inlet chamber 18 with the main flow being controlled thermostatically according to the demand sensed by the thermostat. Additionally, it is assumed that the temperature setting of the thermostatic switch (not shown) has been moved to a selected temperature setting (e.g., 140°F.) to define a set point that is desired to be maintained in the medium sensed by the thermostat, such as for instance, air in a space to be heated.

When there is no demand for burner operation, that is, when the temperature in the space is above the set point, the thermostatic control device 10 will be in the state illustrated in FIG. 1 with the main valve and the step valve closed. That is, in the no demand condition, the snap action mechanism will be in a released state moved away from the operating end 78 of the step valve stem 76 such the force from coiled spring 84 along with the force from coiled spring 82 will move step valve member 68 against step valve seat 66 to close the step valve and the force from coiled spring 84 will move main valve member 48 against main valve seat 46 to close the main valve.

Figure 2:
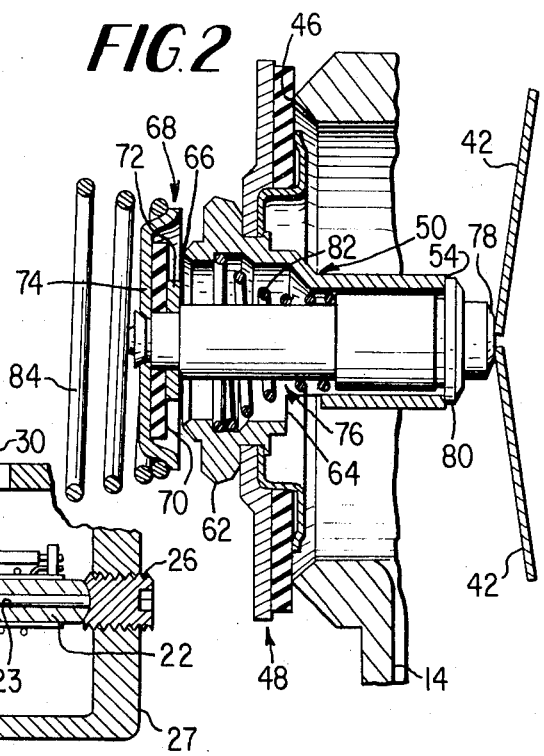
FIG. 2 is an enlarged section of a detail of FIG. 1 but showing it in another controlling position.

Once the temperature in the space drops below the set point, the thermostatic switch will close to supply current to the heating coil 28 which will heat rod 22 to move operating button 25, and the snap action mechanism will be moved to its actuated state with the force on the operating button 25 moving the fulcrum disc 36 sufficiently to cause the disc 38 to move overcenter and be flexed in a direction opposite to that illustrated in FIG. 1. The state of the step opening thermostatic control device of the present invention at this time, after initial movement of the snap acting disc 38, is illustrated in FIG. 2. The flexure of the disc 38 causes lever arms 42 to move the step valve stem 76 against the force of springs 82 and 84 to move step valve member 68 away from step valve seat 66 and open the step valve with a snap action. The relatively large pressure differential across the main valve member 48 holds the main valve closed against the opening force of the lever arms 42 and the spring 82.

Figure 3:
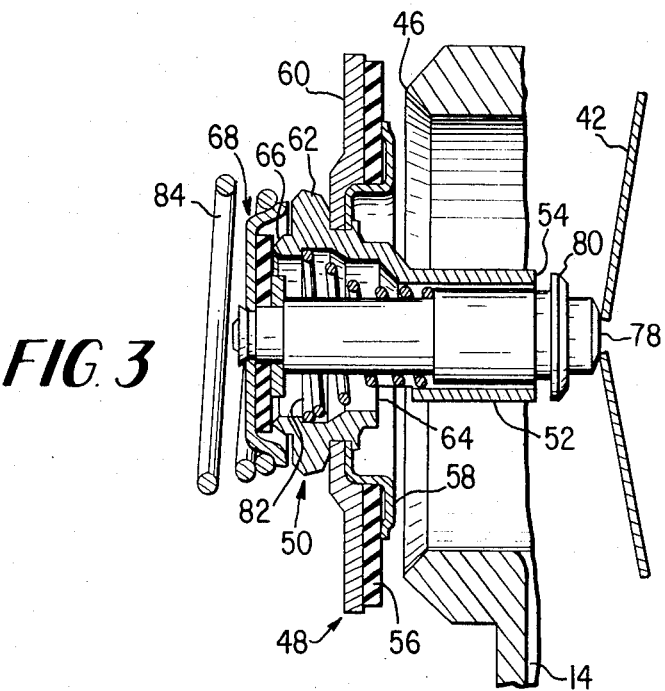
FIG. 3 is similar to FIG. 2 but showing the components in still another controlling position.

After a delay, desirably of approximately 3–8 seconds, the drop in pressure differential due to the opening of the step valve will permit the main valve member 48 to move away from main valve seat 46. That is, further movement of the rod 22 which causes further flexure of the lever arms 42 combined with the reduction in pressure differential will initially move or "pry" the main valve member 48 away from the main valve seat 46; and, thereafter, the further reduction in pressure differential across the main valve member permits spring 82 to fully open the main valve, as illustrated in FIG. 3, such that step valve seat 66 carried by main valve stem 50 abuts step valve member 68. This wide opening of the main valve, which is much greater than the two-level openings obtained by the prior art control devices, increases the fully open capacity of the thermostatic control device to permit its use with thermostats having limited linear expansion for high capacity applications.

Once the heat demand is satisfied and the temperature sensed by the thermostatic switch increases above the set point, the thermostatic switch will open to stop the supply of current to heating coil 28 and permit rod 22 to cool. After rod 22 contracts sufficiently with cooling, the disc 38 will snap overcenter back to the position illustrated in FIG. 1, and the force from spring 84 will thereafter close both the step valve and the main valve to return the thermostatic control device to the no demand condition.

In view of the above, it will be appreciated that the concentric, axial alignment of the step valve inside the main valve with the spring 82 mounted in compression between the main valve stem and the step valve stem to bias the step valve closed permits a thermostat operating the control device to provide high capacity, fully open operation after initial opening of the control device with only limited linear expansion. That is, the operation of the spring 82 in fully opening the main valve and closing the step valve after initial opening of the step valve provides the thermostatic control device of the present invention with a step opening characteristic while further being operable to provide high flow through the casing for high capacity applications.

Inasmuch as the present invention is subject to many variations, modifications and changes in detail, it is intended that all matter described above or shown in the accompanying drawing be interpreted as illustrative and not in a limiting sense.

What is claimed is:
1. A step opening thermostatic control device comprising
 a casing having inlet and outlet means and a flow passage therebetween;
 main valve means movable between open and closed positions to control flow through said flow passage, said main valve means including a main valve seat disposed in said flow passage, a main valve member cooperating with said main valve seat and a hollow main valve stem carrying said main valve member;
 step valve means movable between open and closed positions to control flow through said flow passage, said step valve means including a step valve seat carried on said main valve stem, a step valve member cooperating with said step valve seat and a step valve stem carrying said step valve member and extending through said main valve stem;
 temperature responsive means having an actuated state and a released state;
 a first coiled spring mounted in compression between said casing and said step valve member and biasing said main valve means and said step valve means toward said closed positions; and closed positions; and
 a second coiled spring mounted in compression between said main valve stem and said step valve stem and biasing said step valve member toward said step valve seat,
 said main valve member having a movement away from said main valve seat to open said main valve means, which movement causes said step valve seat to engage said step valve member to close said step valve means;
 said temperature responsive means moving said step valve stem to move said step valve member away from said step valve seat against the force of said first and second spring means to initially open said step valve means when said temperature responsive means moves to said actuated state, and said main valve member being moved away from said main valve seat by said second spring means and said temperature responsive means after said initial opening of said step valve means to open said main valve means whereby said thermostatic control device has a step opening characteristic with the opening of said main valve means delayed after the initial opening of said step valve means,
 said temperature responsive means includes snap acting means mounted on said casing and a heat-motor thermostat operating said snap acting means, said heat-motor operator including a rod having a high thermal coefficient of expansion engaging said snap acting means and a heating coil for heating said rod.

2. A step opening thermostatic control device as recited in claim 1 wherein said flow passage in said casing includes an inlet chamber disposed on an opposite side of said main valve seat from said outlet means, and said main valve member is disposed in said inlet chamber such that the pressure differential across said main valve member maintains said main valve member in engagement with said main valve seat after initial opening of said step valve means to delay opening of said main valve means.

* * * * *